United States Patent [19]
Johnson

[11] 4,236,530
[45] Dec. 2, 1980

[54] GRAIN THRASHER

[76] Inventor: John L. B. Johnson, Rte. 1, Groom, Tex. 79039

[21] Appl. No.: 972,233

[22] Filed: Dec. 22, 1978

[51] Int. Cl.³ .............................................. A01E 7/02
[52] U.S. Cl. ................................. 130/27 R; 130/30 E
[58] Field of Search ............. 130/27 R, 27 AC, 30 E, 130/27 Q, 27 S; 56/14.6

[56] References Cited
U.S. PATENT DOCUMENTS

| 3,593,719 | 7/1971 | Ashton | 130/27 R |
| 3,760,813 | 9/1973 | Mathews | 130/27 R |
| 4,146,039 | 3/1979 | Grillaud | 130/27 R |
| 4,185,642 | 1/1980 | Ridgway | 130/27 R |

Primary Examiner—Robert A. Hafer
Attorney, Agent, or Firm—Cushman, Darby & Cushman

[57] ABSTRACT

An improved self-propelled grain harvester and thrashing machine characterized by an improved thrashing assembly exhibiting on-the-go adjustment capabilities which allows upper and lower cone thrashing units to be moved toward or away from one another thereby contracting or expanding the spacing therebetween defining the thrashing or rubbing area. The machine also includes collection and storage containers, and separate means for discharging the thrashed wheat, as well as the chaff.

9 Claims, 10 Drawing Figures

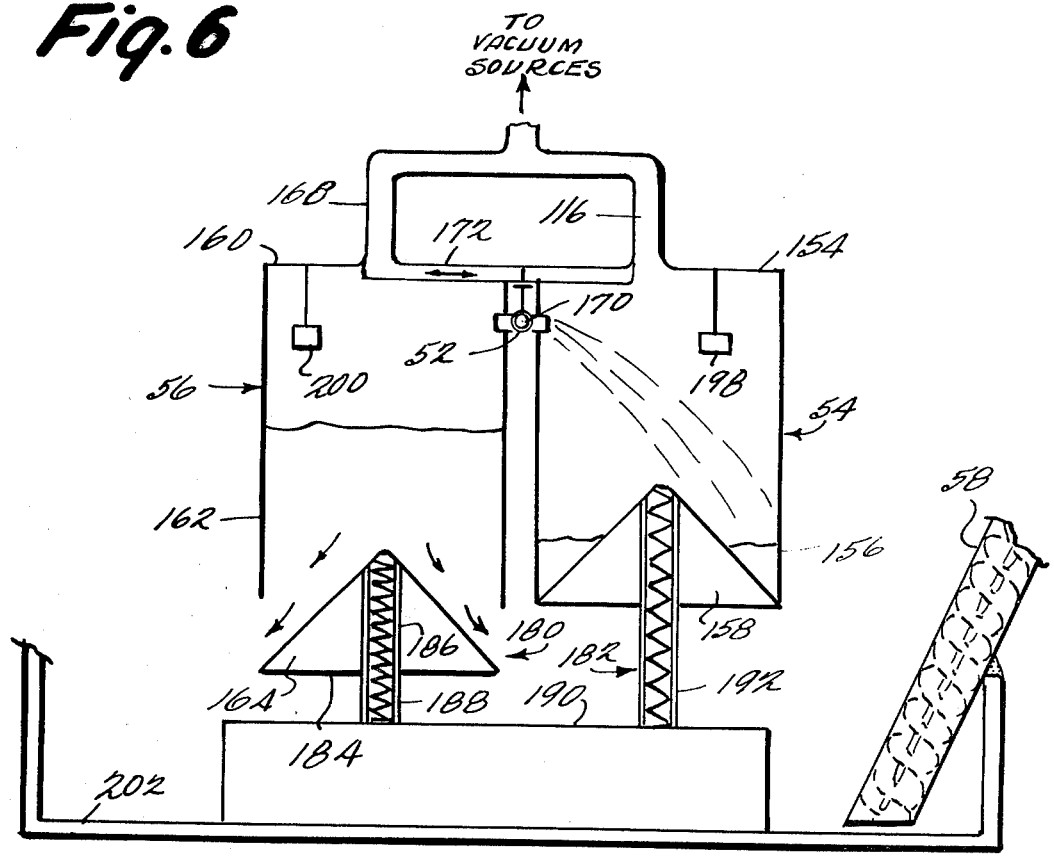
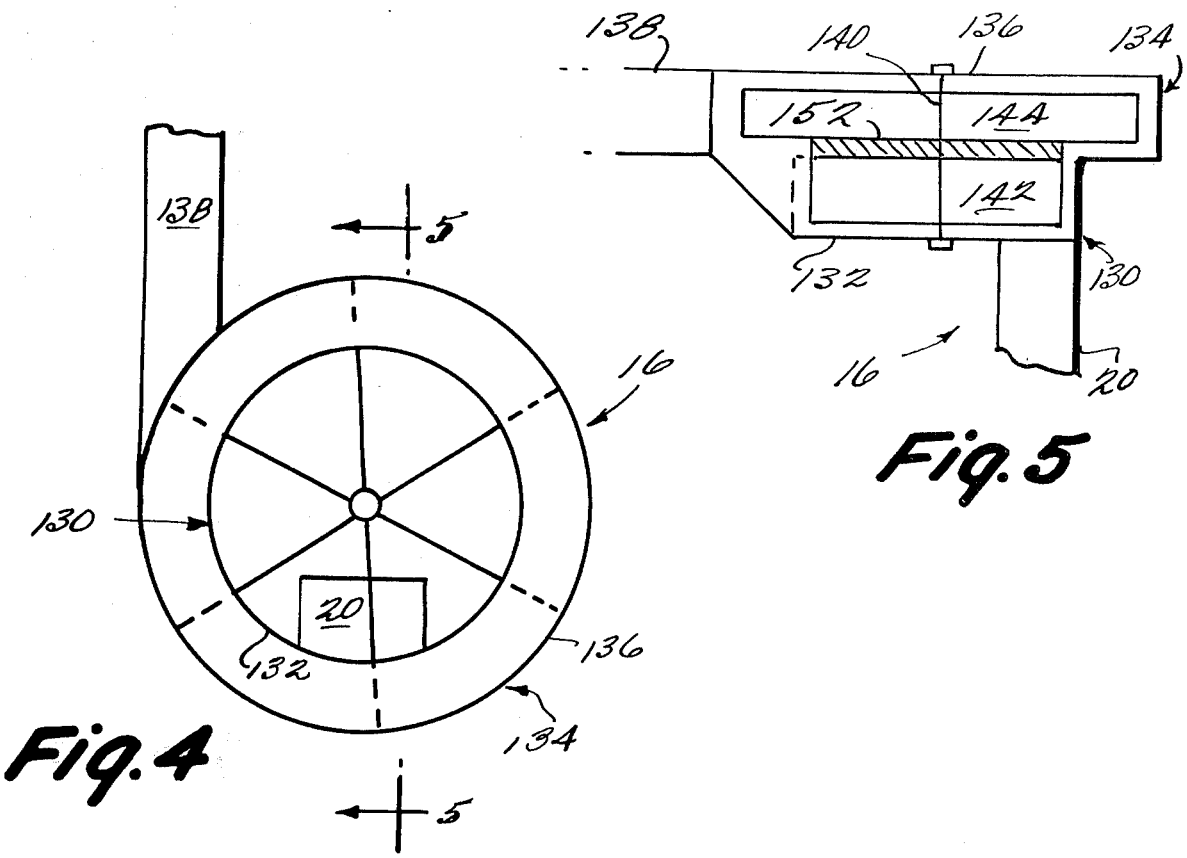

GRAIN THRASHER

The present invention concerns an improved thrashing and separating assembly which is uniquely suited for thrashing grain and in particular separating the chaff and straw from the grain without crushing or shattering the kernels. One difficulty encountered with many prior art techniques for thrashing grain has been the production of thrashing equipment which is both universally useful in thrashing various types of wheat as well as other thrashable types of crops while at the same time performing an equally efficient thrashing job in the face of changing thrashing characteristics of the crop being harvested. Some types of wheat commonly referred to as shatter-resisting varieties, are notoriously hard to thrash. Conversely, there are other types or varieties of wheat which are notoriously easy to thrash but depending upon being attached by rust or other forms of plant diseases the ease of thrashing may be variable throughout a given field. This is so since the effects of plant diseases may not be, and most usually are not, uniform throughout a given field. Therefore, a single field may exhibit a variety of thrashing difficulties even though portions of the field may be easily thrashed without any difficulties.

It is known that to accomplish efficient thrashing, the thrashing should be done with just enough power or be just severe enough so as to dislodge the grain from the head of the wheat stalk without crushing the grain. It is believed most conventional approaches do not gently rub the grains as can be done with human hands but rather grind most everything to a fine degree which is not desirable. If severe forces are used, it will only cause a further breaking up of the wheat head and stalks making any subsequent separation of the chaff and straw portions of the crop from the grain kernels themselves more difficult. Consequently, this will lower the quality of the grain being harvested.

For this reason, the present invention seeks to provide thrashing apparatus which includes the ability to be remotely controlled according to changing thrashing conditions. Thus, during the thrashing operation the operator will be able to adjust the thrashing unit so as to most efficiently conform with the thrashing requirements of the crop being harvested in order to take into consideration the potentially present ununiform thrashing conditions that may be involved in thrashing a large field of wheat and to compensate for any such changing conditions.

The prior art contains examples of prior attempts at devices for thrashing wheat of which Nye, U.S. Pat. No. 1,884,151 is representative. This apparatus discloses the use of a fixed and movable disc arrangement. Each disc is provided with teeth through which the harvested grain is directed for separating the grain kernels from the chaff and straw. As the harvested wheat or grain passes between the surfaces of the fixed and rotating discs it is forced between the meshing teeth so as to dislodge the grain kernels from the head of the wheat stalk. As the material passes from the center of the device outwardly to the edges thereof, the grain kernels and heavier pieces of debris such as straw knuckles or heavier pieces of weeds are discharged in a horizontal fashion due to the centrifugal force applied thereto by the rotating disc. Flow of the harvested material through the device is accomplished by means of an air flow caused by a fan, with the air flow passing around the sides of the rotating disc. Thus, the lighter weight materials, principally made up of the lighter chaff and straw is not directed horizontally away from the periphery of the edge of the discs but rather moves with the air flow around the periphery of the rotating disc and thence through the fan. In this manner, the lightweight material is collected in one area while the grain and other heavier materials, discharged in a horizontal direction from the rotating disc, can be subsequently collected separately from the lightweight debris. There is no consideration given in the Nye patent to the varying difficulties which may be encountered in thrashing wheat or various other products and no provision is made in the Nye apparatus for varying the distance between the fixed and rotating portions of the thrashing apparatus in which the grain is being thrashed so as to compensate for these variations in thrashing difficulty. Further, as was pointed out hereinbefore, it is important to have the thrashing job be as efficient as possible so that it is only just severe enough to dislodge the grain from the head but not to further break apart the head of the wheat stalk or crack the grain. As brought out in the Nye patent, the grain kernels as well as heavier pieces of straw and weeds are discharged by that apparatus thereby creating the further task of separating the grain from the other debris.

There and other objects will become clearer as the detailed description of the present invention proceeds in view of the following drawings which show:

FIG. 4 is a diagrammatic front elevational exterior view of the two-stage blower used in the present invention;

FIG. 5 is a diagrammatic cross section taken along the line 5—5 in FIG. 4;

FIG. 6 is a diagrammatic cross section view of the two-chambered grain recovery assembly;

Figure 10:
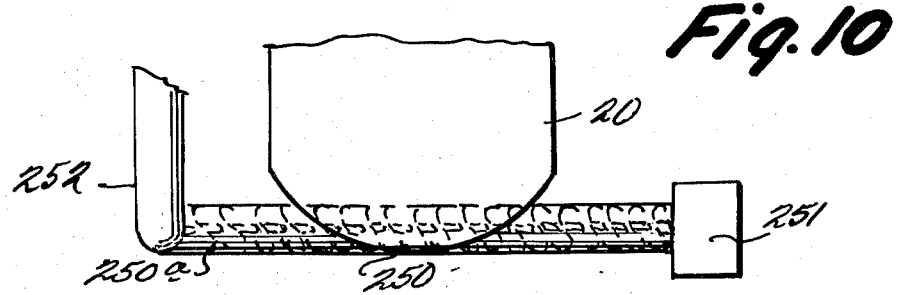

FIG. 10 diagrammatically shows an additional return system for returning uncracked grain from the discharge chute to the thrasher.

Figure 1:
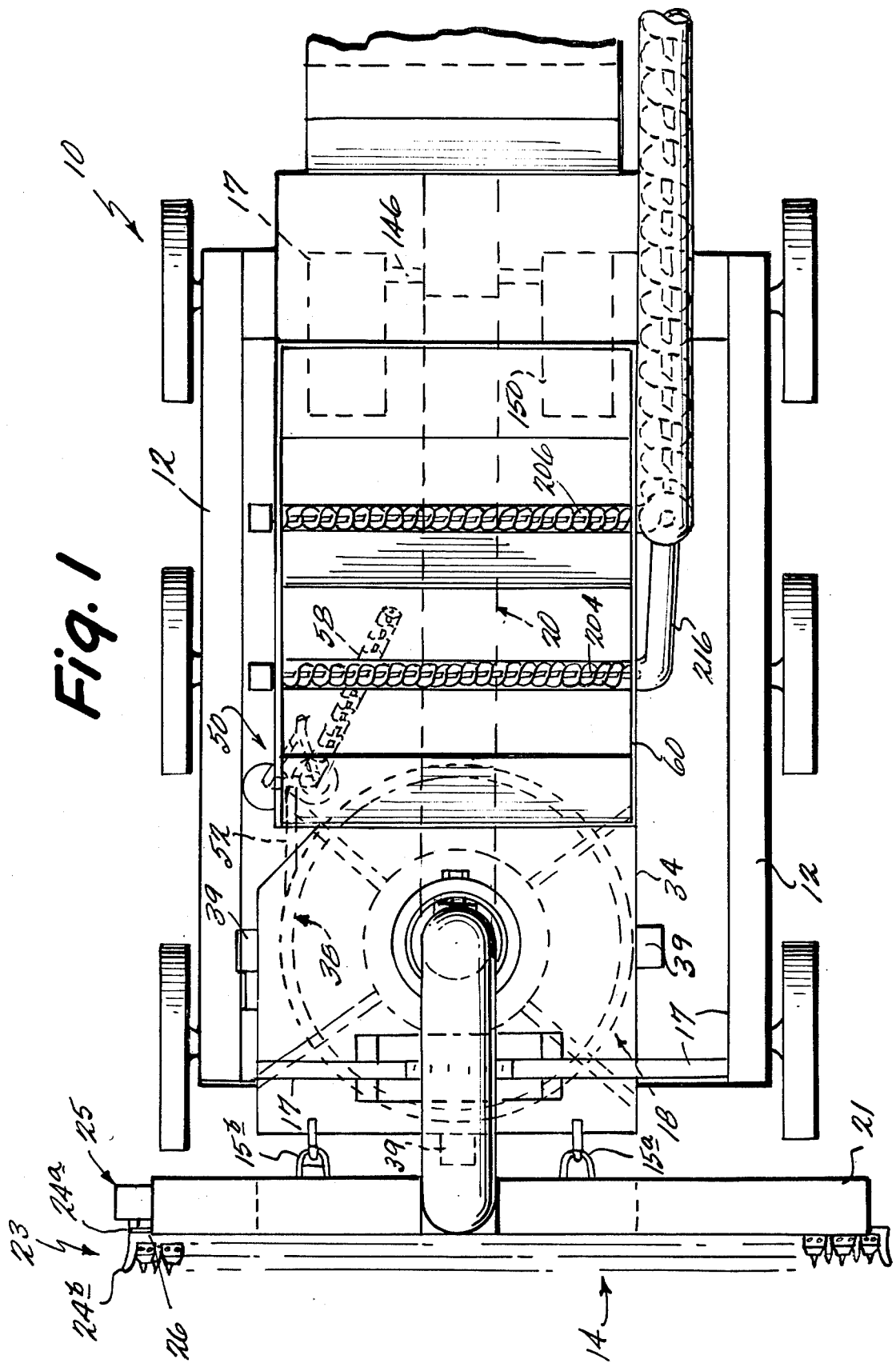
FIG. 1 is a diagrammatic top plan view of the present invention.
Figure 2:
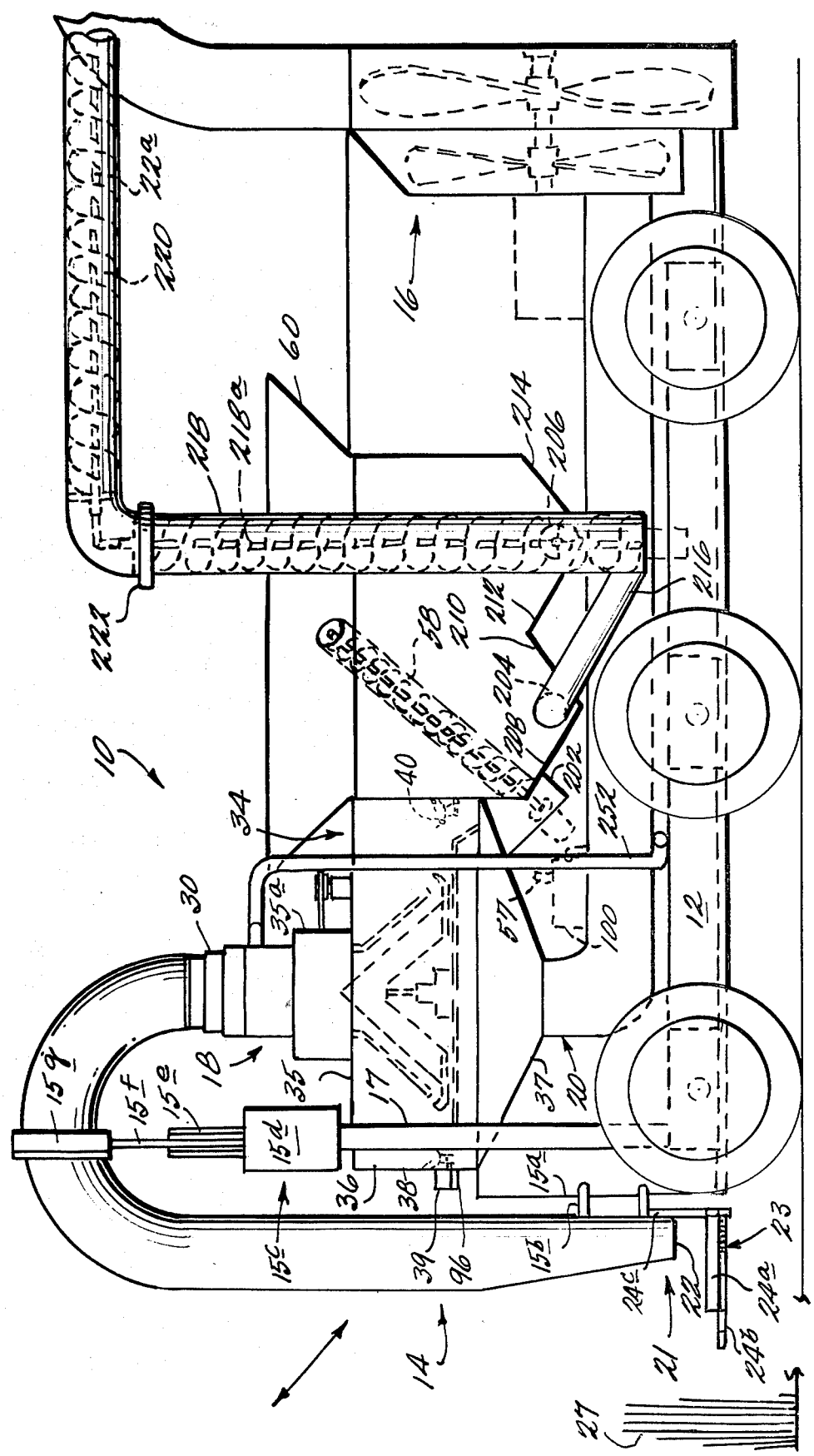
FIG. 2 is a diagrammatic cross section taken along line 2—2 in FIG. 1.

Turning now to FIGS. 1 and 2 the thrashing machine, generally designated by the numeral 10, is preferably mounted on a conventional six-wheel drive, four-wheel steering chassis 12 suitably provided with conventional springing and shocking devices (not shown) so that the apparatus can cross fields and furrows and turn in very tight circles. It should be understood that the chassis is intended to include the entire outer structure of the thrashing machine 10. While other basic vehicle structures could be used, the vehicle must be able to negotiate severe terrain and at the same time be able to travel on public highways. Likewise, the apparatus can be provided with suitable conventional type trailer hitches so that it can pull wagons capable of catching the chaff and straw discharged from the machine during the harvesting process. However, it should be understood that rather than pulling such catching devices, it is preferred that the apparatus be provided with an exhaust chute to discharge waste chaff and straw directly into trucks driven alongside of the present apparatus. Also, the chaff and straw could simply be discharged directly onto the field in the form of a windrow or it could be scattered from the exhaust chute according to the dictates of the next use of the field.

The thrashing machine 10 begins with the collection scoop 14 which is connected to a two-stage blower assembly, generally indicated at 16, operating through the thrashing assembly, generally indicated at 18, and a chaff discharge chute 20.

Collection scoop 14 extends across substantially the entire frontal area of thrashing machine 10 and when in operation will be positioned adjacent the ground at the desired level to completely harvest a given crop, such as wheat, so that as wheat is cut it will be sucked into the thrashing machine 10 through scoop 14. Scoop 14 is movably attached to chassis 12 at a number of points two of which comprise fixed guide arms 15a connected to the front of chassis 12 and thrashing housing 34. Guide arms 15a extend approximately from the bottom of chassis 12 and the bottom front edge of thrashing housing 34. Guide lugs 15b are attached to the rear side of scoop 14 and slide along guide arms 15a thereby preventing forward and rearward swaying or movement of scoop 14 as it is moved vertically.

Vertical movement is provided by a hydraulic ram assembly 15c mounted by suitable braces 17 to chassis 12. Ram assembly 15c is comprised of a mounting base 15d on which a hydraulic cylinder 15e is mounted. Drive arm 15f of cylinder 15e is connected to a mounting collar 15g which is itself secured around the upper central portion of scoop 14. The hydraulic assembly 15c is conventionally connected to a source of hydraulic power, generally indicated at 150. The third attaching mechanism is provided by the top telescoping portion 30 of scoop 14 which will be more fully described hereinafter. Actuation of the hydraulic ram assembly 15c serves to raise and lower scoop 14 toward and away from the ground or into and out of its operating position and guide arms 15a and guide lugs 15b prevent unwanted horizontal movement of scoop 14. Collection scoop 14 is also provided with a wide collection mouth 21, the front or lower end of which is narrowed so as to provide a relatively narrow suction inlet 22. It should also be noted that alternatively a hydraulic ram attached to the frame 12 adjacent each of the front wheels could be employed together with a series of linkage arms connected between the ram and the lower portion of scoop 14 to raise and lower each side of scoop 14.

Sickle bar assembly 23 is attached to the lower edge of scoop 14 and includes a cutting bar 24a provided with guards 24b. Cutting bar 24a is attached to a mounting frame 24c which in effect is an air tube and is secured by any convenient means such as bolts (not shown) to scoop 14 so that the entire sickle bar assembly 23 is positioned beneath the bottom of scoop 14 and will, accordingly, move therewith.

Figure 9:
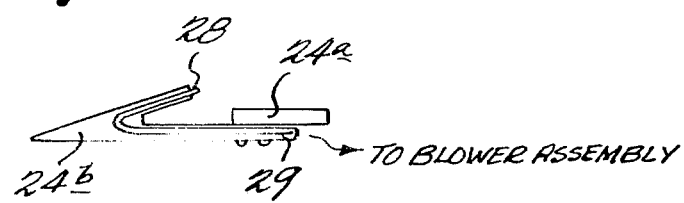
FIG. 9 is an enlarged diagrammatic view of a modification of the sickle bar assembly.

The sickle bar assembly 23 is preferably hydraulically driven by a hydraulic motor 25 (shown in FIG. 1) mounted on one end, such as the right end of cutting bar 24a. Hydraulic motor 25 is of a conventional design and includes therein self-contained planetary reduction gearing (not shown) and serves to power a sickle chain 26 which encircles cutting bar 24a, to produce a cutting motion as it passes along the front or cutting bar 24a and returns along the rearside thereof. Since the sickle bar assembly 23 is, in other respects, of a conventional design, further description thereof is not deemed to be essential for a complete understanding of its construction or use. However, as an aid in cutting stalks of wheat 27 and lifting of grain heads thereon into inlet 22, each guard 24b could be provided with a rearwardly and upwardly slanted air passage 28 as shown in FIG. 9, which is connected to a separate blower assembly and compressor by air line 29. During the cutting operation, compressed air would be forced through air line 29 and passages 28 with the thus formed rearwardly vertical directed jet of air serving to help lift the grain heads toward or into inlet 22. Preferably, air line 29 is positioned so as to be in contact with drive motor 25 so that air flowing therethrough will be at least slightly heated. Raising the temperature of the air passing through air line 29 will, it is believed, aid in removing crop moisture deposited on thrashing surfaces reducing build of undesirable material from the stalks and weeds being harvested.

As the thrashing machine 10 traverses across the field of grain, stalks of grain 27 are cut and picked up by scoop 14 and passed through a 180° bend which forms the upper portion of collection scoop 14, through the accordian portion 30, the third support for scoop 14. As shown best in FIGS. 2 and 3, scoop 14 terminates or discharges into the thrashing assembly 18. The discharge end 31 of accordian portion 30 is securely attached to an upwardly extending portion 35a of the topwall 35 of housing 34. The accordian portion 30 allows some degree of movement of the discharge end 31 as scoop 14 is raised and lowered.

Thrashing assembly 18 is comprised of a double-coned thrashing unit generally indicated at 33 located within thrashing housing, generally indicated at 34, comprised of top wall 35, sidewalls 36 and an inclined bottom wall 37. The inclined bottom wall 37 terminates at and is connected to the chaff discharge chute 20 which in turn passes along the length of the chassis from front to back and is connected to the intake side of a two-stage blower assembly 16.

Figure 8:
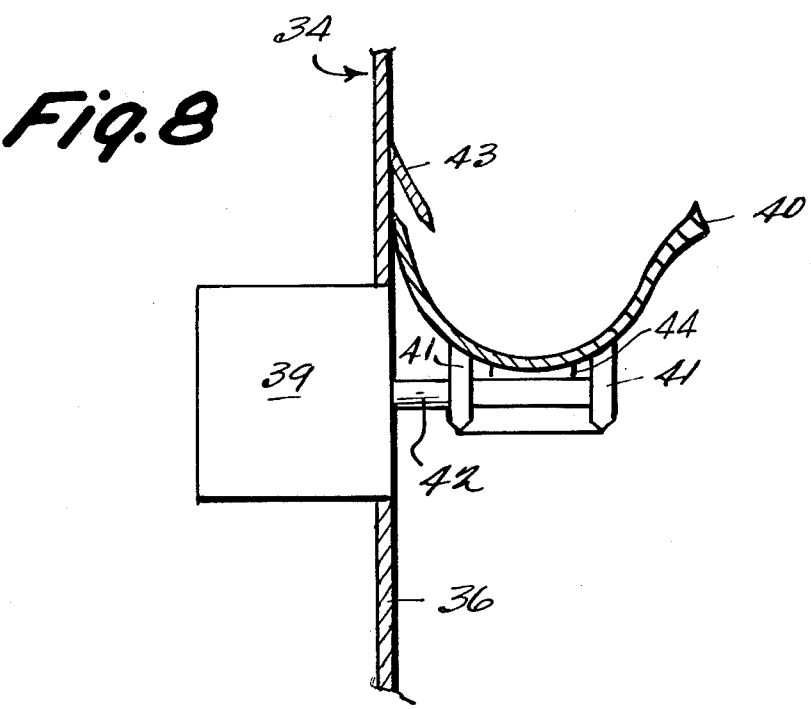
FIG. 8 is a diagrammatic view of the grain collection tray drive assembly.

As shown in FIG. 8 the housing 34 together with topwall 35 and sidewalls 36 define a circular thrashing chamber 38 therein. A circular tray 40 which is essentially a C-shaped cross section is rotatably mounted within chamber 38 and supported therein by pairs of beveled support rollers 41 attached to drive shafts 42 of motors 39 which are attached on the exterior of sidewalls 36. As shown in FIG. 1 a plurality of motors 39 and their pairs of support rollers 41 are spaced around the periphery of chamber 38 and together cooperate to support and provide the drive to revolve tray 40. The pairs of beveled rollers 41 are secured to shafts 42 with the beveled surface facing inwardly in order to mesh with the curved bottom of tray 40. Additionally, the bottom of tray 40 is provided with a depending guide flange 44 designed to fit between the pair of wheels 41 to prevent tray 40 from jumping off wheels 41. By shaping grain tray 42 in the fashion shown it is believed to be possible to collect, in the most desirable fashion possible, the majority of the grain separated by the thrashing assembly 18. To ensure no grain can hit the interior walls of chamber 38 and fall behind tray 40, a deflection baffle 43 is attached to the interior wall above tray 40 with its leading edge projecting into the top portion thereof. Thus, any grain hitting the wall above baffle 43 will be deflected into tray 40 as it falls.

Located adjacent the revolving grain tray 40 is a grain collection assembly generally indicated at 50 which is comprised of a vacuum line 52, collection bins 54 and 56 for each collecting about ¾ to about one bushel of grain kernels, and a feed line 58 for transporting the grain from collection bins 54 and 56 respectively to grain storage bin 60 in a manner that will be more fully discussed hereinafter.

Figure 3:
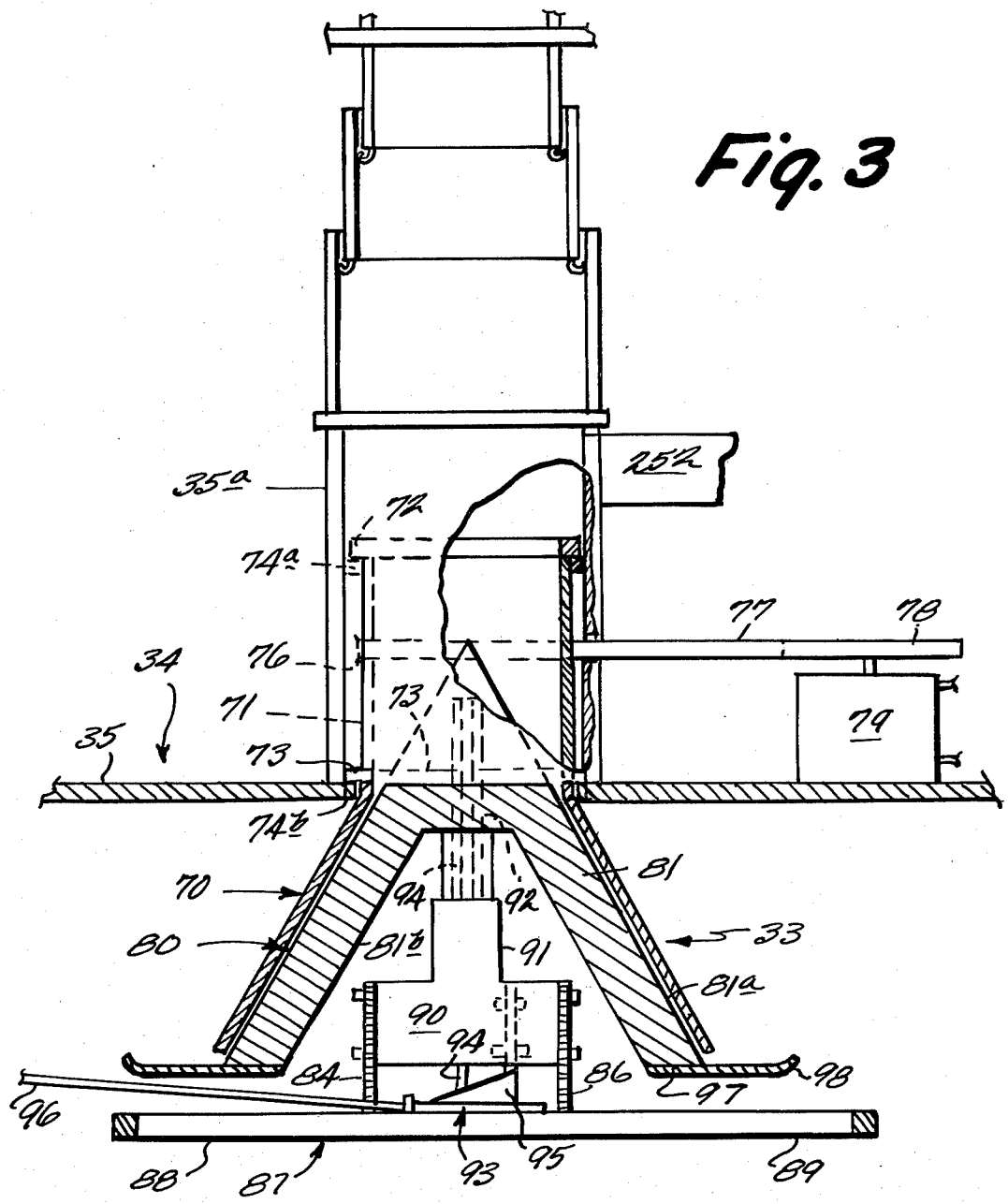
FIG. 3 is an enlarged diagrammatic view of the thrashing assembly according to the present invention.

Turning now to FIG. 3, which is an enlarged view of the interior components of thrashing assembly 18, it can be seen that the discharge end 31 of collection scoop 14 is connected to the upwardly extending portion 35a of thrashing housing 34 within that extended portion 35a which fits the upwardly extending and turning segment 71 of cone 70.

Cone 70 is supported by two sets of circular bearings 72 and 73 extending around and secured to the upwardly extending portion 71 and respectively sit on supports 74a and 74b located on the interior surface of the upwardly extending portion 35a. Cone 70 is caused to rotate at a desired speed and this is effected by means of pulley 76, secured around cone portion 71, and a drive belt 77 which serves to connect pulley 76 to drive pulley 78 and hydraulic motor 79.

Centrally positioned internally of cone member 70 and mounted on a shaft passing through hydraulically powered motor 90 is an inner cone assembly generally indicated at 80. The inner cone assembly 80 is comprised of a conically-shaped member 81 which is provided with an outer surface 81a and an inner surface 81b.

Connected to the interior of cone member 81 are threaded vertical supports 84, 85 and 86 which are respectively supported on a support member 87. Preferably support member 87 is comprised of at least two separate crossing members 88 and 89 positioned so as to cross one another. Members 88 and 89 must extend substantially across thrashing unit 18 and as shown in FIG. 2 are supported by and connected to bottom wall 37 of housing 34. Thus, members 88 and 89 provide the support for thrashing assembly 18 and in order to allow for some horizontal positioning of the inner cone assembly 80 slots (not shown) can be provided in members 88 and 89. The threaded vertical supports 84-86 are attached to cross members 88 and 89 and serve to hold a conventional hydraulic motor 90 in position beneath inner cone assembly 80 and also to assist in at least initially aligning inner cone assembly 80 within cone 70. Screws 84-86 are preferably evenly spaced apart around a circle located just beyond the sides of the housing for motor 90.

A hollow guide tube 91 extends upwardly away from the top of motor 90 and provides centering support for a hollow drive shaft 92 therein. Hollow drive shaft 92 is connected to the interior apex of the cone-shaped member 81 and is drivingly engaged by conventional gearing (not shown) to motor 90.

Since grain of different size will be encountered it is essential that the spacing between cone assemblies 70 and 80 be adjustable. Such adjustment is accomplished by an adjusting assembly, generally indicated at 93 and includes an adjusting shaft 94 extending within hollow driveshaft 92 from the apex of cone member 80 down to an adjusting block 95 located beneath motor 90 and slidingly retained on support 87. A control cable 96 connects block 95 to an operating means located in the cab of the thrashing machine 10. Thus, the operator can cause block 95 to slide back and forth to thereby adjust the vertical position of shaft 94 and accordingly cone assembly 80.

Cone member 81 is provided with a bottom wall member 97 which extends outwardly beyond the bottom edge of cone 81 in the form of a flanged edge 98 which edge is provided with a slight upward curve to help direct the flow of grain for collection. Thus, an opening exists between cones 70 and 80 through which the grain and chaff must pass. By thus being able to control the distance between the inner cone assembly 80 and the conically-shaped outer cone assembly 70 it is possible to create differing amounts of severity with respect to the thrashing treatment occurring to the harvested wheat because the degree of rubbing action provided is dependent upon the size of the space defined between members 70 and 80.

As indicated above, the inner cone assembly 80 is caused to rotate by means of a hydraulically powered motor 90. It is preferred that inner cone member 81 turn in the same direction as cone 70 and at a relatively constant speed. Further, that speed need only be great enough for each different crop to allow the grain to be thrown horizontally away from the flanged edge 98 of cone member 81 into grain tray 42. Outer cone assembly 70 will preferably have a speed in excess of cone 81 in order to produce the necessary rubbing action to separate grain from chaff. It is believed that during thrashing, the drive motor for the inner cone assembly 80 will actually act like a brake.

During operation, the flow of air together with the moving grain and chaff will maintain the spacing between cones 70 and 81. Preferably the distance therebetween for wheat could vary from about $\frac{1}{8}''$ to about $\frac{1}{2}''$ depending upon thrashing conditions.

Turning now to FIGS. 4 and 5, specifically the two-stage blower assembly 16 is comprised of a first stage generally indicated at 130 having a first stage housing 132, a second stage generally indicated at 134 and a second stage housing 136. The chaff discharge chute 20 in FIG. 5 is attached to the input side of the first stage and a blower discharge chute 138 is attached on the discharge side of the second stage 134.

Each stage of the blowing assembly 16 employs a common drive shaft 140 on which are attached both first and second stage blades 142 and 144 respectively. Drive shaft 140 is connected through a conventional geared driving assembly generally indicated at 146, and through a drive belt 148 to the main drive engine, generally indicated at 150.

As is evident from FIG. 5, the blades 142 and 144 are connected to a common blower wall 152 which serves to form in effect a housing wall between the first and second stages 132 and 134, respectively. The close fitting housing for the first stage 132 extends for only a partial distance around the circular blower housing, approximately 150° from the input at chute 20, so that as the chaff and other light portions of the material being harvested pass through the thrashing assembly 18 and chute 20 into the two-stage blower assembly 16 the material will travel through the first stage for approximately 150° at which point the circumference of the first stage meshes or joins the circumference of the second stage housing 136 so that the material is transferred into the second stage 134. Thereafter, the material will travel for approximately 270° around or through the second stage 134 for an overall total of about 480° prior to its being discharged through blower discharge pipe 138.

Figure 7:
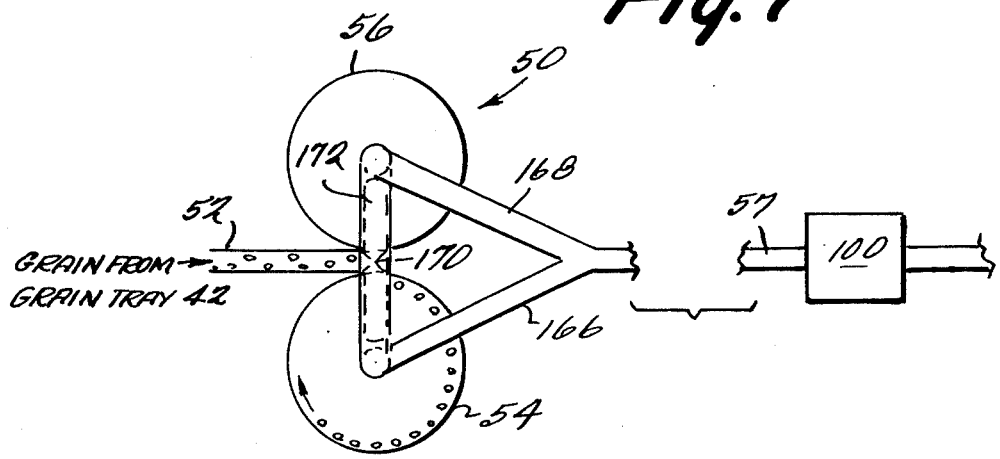
FIG. 7 is a diagrammatic top plan view of the two-chambered grain recovery assembly shown in FIG. 6.

Turning now to FIGS. 6 and 7, the grain collecting assembly 50, as was indicated previously herein, is comprised of a vacuum line 52 leading to collection bins 54 and 56 and ultimately to a feed line 58 which leads into the primary collection bin 60.

Collection bin 54 is comprised of a top wall 154, sidewalls 156 and a cone-shaped bottom closure member 158. Collecting bin 56 is comprised of a top wall 160, sidewalls 162 and also employs a cone-shaped bottom closure member 164 similar to member 158 in bin 54.

As shown in FIG. 7, vacuum is supplied to bins 54 and 56 primarily from the two-stage blower assembly 16 via the chaff discharge chute and in order to have sufficient air suction to ensure grains will be removed from collection tray 42 an auxiliary blower 100 is inserted within air line 57 which connects blower assembly 16 to collection bins 54 and 56. As shown in FIG. 7, air line 57 is respectively connected to bins 54 and 56 by a Y-shaped line segment comprised of lines 166 and 168.

Control over the feeding of grain kernels into collecting bins 54 and 56 is provided by means of a flap valve 170 together with an automatically actuated, vacuum control slide valve 172. As shown in FIG. 6, feed line segment 166 extends into bin 54 and is secured within topwall 154 by any convenient means such as by welding. In a like manner, feed line segment 168 extends through and is secured to topwall 160 of collection bin 56. Slide valve 172 is movable between first and second positions which is shown by full and dotted lines, respectively. While there are several conventional ways to move slide valve 172 back and forth between these two positions, the preferred approaches are to employ a solenoid operated hydraulic cylinder or a motor driving a rack and pinion (not shown). When slide valve 172 is in the first, full line position, it blocks the effect of the two-stage blower assembly 16 from acting on bin 56 while at the same time serving to open the end of feed line segment 166 to collection bin 54 so that air flow will, in this instance, pass through scoop 14, thrashing assembly 18, vacuum line 52, bin 54, line segment 166, feed line 57, auxiliary blower 100 to blower 16. Flap valve 170 is connected to and moves with the vacuum control slide valve 172 so that grain moving along vacuum line 52 will be directed toward the bin which, due to the positioning of slide valve 172, is connected to the vacuum being supplied through feed line 57. Flap valve 170 is used to close the connection between feed line 52 and the bin not connected to blower 16 through line 57 as is determined by vacuum control slide valve 172. Further, flap valve 170 aids the flow of grain kernels from vacuum line 52 into bin 54 or 56. In this manner, grain being supplied through feed line 52 from the circular tray 42 in the grain thrashing assembly 18 will be directed to one of the two collecting bins 54 or 56. As shown in FIGS. 6 and 7, grain is being fed into bin 54. As shown in FIG. 7, to feed grain into collection bin 56 slide valve 172 would be moved to the position as shown in phantom lines and in a like fashion the flap valve 170 would also be moved into the position shown in phantom so that bin 56 was now directly connected to the vacuum being supplied to line 57 by means of feed line segment 168 and flap valve 170 would serve to initially direct grain kernels fed along line 52 toward bin 56.

The closures for bins 54 and 56 are respectively comprised of closure devices generally indicated at 180 and 182. Each of these closure devices is comprised of a cone-shaped closing member 184 having its walls sloped an angle of about 45°. A guide tube 186 extends downwardly away from the underside of the cone-shaped member 184 and cooperates with an upstanding tube 188 suitably supported on a support plate 190 with a compression spring 192 being positioned between closure member 184 and the support 190 and are respectively attached at each end end to the support 190 and cone-shaped member 184. Spring 192 is just sufficient to lift closure member 184 into its upward closed position and closure member 182 is shown as it would be in that closed position whereas closure member 180 is shown in an open position with grain flowing out of bin 56.

Each bin 54 and 56 includes an evacuating means 194 and 196 as well as control switches 198 and 200. In the closing cycle for closures 180 and 182 when the closure members 184 are lifted against the seat of bins 54 and 56 the vacuum source through evacuating means 194 and 196 will slowly increase the vacuum within the respective bin being closed to that the closure 184 is securely held in its closed position ready for the next filling cycle. During the filling cycle, as is currently going on in FIG. 6 within bin 54, when the bin is filled to a predetermined extent the switch 198 will sense the correct filling level and will actuate suitable switching controlling the solenoid controlled slide valve 172 as well as the opening of the bottom closure member 184. Thus, the filling sequence will change from one bin to the other with the filled bin being emptied as the bottom closure member 184 is lowered to its open position.

The centrifugal force of the grain entering the side of each of the bins 54 and 56 will separate it from the vacuum air being pulled through air line 57 and the air force is such that the grain will drop into the bin whereas the air will leave the central top portion of bins as shown in FIG. 7.

As grain empties from bins 54 and 56 the grain drops into a collection bin 202 from which grain is carried into bin 60 by means of conveyor 58. Located in the bottom of bin 60 are two conveyors 204 and 206 which are preferably horizontal auger type grain conveyors of a conventional design. The bottom surfaces of bin 60 indicated respectively at 208, 210, 212 and 214 are sloped toward conveyors 204 and 206 so that grain will be fed by gravity into the horizontal auger 204 and 206. It should be noted that auger 204 discharges into a downwardly directed chute 216 which feeds downwardly into the main vertical auger tube 218 and specifically at the bottom thereof. In addition, horizontal auger tube 206 feeds directly into the main vertical auger 218. Located within the main vertical auger tube 218 is a conventional vertical auger 218a which will in turn discharge into the main horizontal discharge auger tube 220 and housing auger 220a will move the material therealong for ultimate discharge into a vehicle passing next to the thrashing device 10. The horizontal discharge auger tube 220 is pivotally attached to the vertical auger tube 218 as at 222 in order to allow the horizontal auger tube to be swung at right angles with respect to the machine for unloading into a truck or grain cart in a conventional manner. Accordingly, additional description thereof is not deemed to be essential to a complete understanding thereof.

In operation, grain being harvested which has been cut would initially be pulled into inlet 24 of collection scoop 14 by means of the vacuum or suction placed thereon because of the two-stage blower assembly 16 and by pressure of the jets in sickle bar guards. The harvested grain would then pass into thrashing assembly 18 and specifically between the outer rotating cone 70 and the inner rotating cone assembly 80. Depending upon the nature of the grain being harvested and the difficulty noticed by the operator in thrashing that particular grain, the relative distance between cone members 70 and 80 will be adjusted so that the severity of the effect of the rotation of the cones in thrashing assembly 18 will be just sufficient to dislodge grain kernels from the head of the wheat without virtually destroying the wheat stalks.

It should again be pointed out that the separation between cones 70 and 80 should be enough to effect a fairly gentle rubbing of the grain kernels. Such rubbing does not subject the grain to beating and cracking forces so often encountered in thrashing devices. By thrashing in this manner and by observing the thrashing operation and making any necessary adjustments in the thrashing assembly 18, the harvesting process will more efficiently separate the kernels of grain from the lighter-weight chaff and straw. Because of the rotation of the inner cone assembly 80, the chaff and straw together with the grain kernels will all be discharged outwardly away from the peripheral edge 98 toward sidewalls 36. However, because of the relative difference in weight and surface area between the grain kernels on one hand and the chaff and straw on the other, the grain kernels will be directed a further distance across the space between the outer peripheral edge 98 and sidewalls 36 toward and into the rotating grain tray 42. Also some grain kernels will strike sidewall 36 and fall into grain tray 42 which as it is resolved comes into contact with vacuum line 52 which collects grain kernels therein and moves them to either bin 54 or 56. The chaff and straw will not move as far in a horizontal direction as the grain but instead will be pulled downwardly by the vacuum or air flow created by the two-stage blowing assembly 16 toward the inclined bottom 40 of thrashing assembly 18 and thence into the chaff discharge chute 20. Thereafter, the chaff and straw will pass through the two-stage blower assembly 16 as described hereinbefore, and be finally discharged from blower discharge tube 138 for discharge into a truck or directly onto the field being harvested.

As indicated above, the grain after it is collected in either bin 54 or 56 is sequentially emptied into the main storage bin 60 for collection. Collection bins 54 and 56 each preferably have a capacity of about ¾ to one bushel and if a count is kept of the number of times each of these bins is emptied, a fairly accurate idea can be obtained as to the number of bushels being harvested. Grain will ultimately be removed from storage bin 60 by means of a series of horizontal and vertical augers for ultimate discharge into a truck or grain cart which can be either pulled by this vehicle or by a separate vehicle running alongside the main thrashing device 10.

Turning now to FIG. 10, it may sometimes be desirable to retreat or rethrash the heaviest material which ultimately reaches discharge chute 20 since part of that heavy material may include grain. In order to accomplish that purpose the present invention can also include apparatus to return at least a portion of the discharged material to thrashing assembly 18. A trough or chute 250 can be provided which extends transversely of chute 20 and in particular across the bottom thereof. This chute can contain an auger 250a driven by a suitable drive motor 251. The auger 250a will effectively push part of the heaviest material at the bottom of chute 20 to a return conduit 252 the other end of which is connected to the upstanding portion 35a of the thrashing housing 34. Return conduit 252 will be acted upon by the various suction devices and the material fed to it by auger 250a will be sucked into thrashing assembly 18 where it will undergo further thrashing.

While the invention has been described in connection with what is presently conceived to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation of such claims so as to encompass all such equivalent structures.

What I claim is:

1. An improved thrashing machine for thrashing a variety of crops comprising a main frame including at least front and rear axles together with wheels for supporting the thrashing machine, motor means for powering the thrashing machine, steering means for controlling the movement of the thrashing means, means defining a first flow path having a first stage for initially moving the crop being cut and a second stage for moving only chaff and weeds, means defining a second flow path for moving only the harvested crop, said first flow path means including vacuum means for producing a suction type air flow along first flow path means, said first stage including crop collection means for cutting and initially receiving the crop, a thrashing assembly for receiving the cut crop and for separating the crop being harvested from chaff and weeds cut therewith, said thrashing assembly including a hollow housing structure having top, side and bottom wall members defining a thrashing chamber therein, said crop collection means being movably connected to the topwall member thereby defining the inlet to said thrashing chamber, interior and exterior rotatably supported, conically-shaped, thrashing members spaced from one another and being centrally positioned within the thrashing chamber to receive between them the cut crop entering through the inlet so that the suction air flow passes between the two thrashing members, means for moving at least one of said thrashing members so that the distance therebetween is variable and separate drive means for rotating each of the thrashing members, harvested crop collection means for catching the harvested crop flowing from said thrashing members, said harvested crop collection means being positioned within said thrashing chamber and movably attached to the sidewalls thereof so as to be radially spaced from said thrashing members, support and drive means for both supporting and moving said harvested crop collection means, said second stage of said first flow path beginning in the space defined between said thrashing members and said harvested crop collection means, said second stage including at least the bottom wall of said thrashing chamber, means defining an outlet opening therein, and first conduit means connected between the outlet opening in the bottom wall of said thrashing chamber and said vacuum means, first discharge means connected to said vacuum means for discharging chaff from said thrashing machine, said second flow path including second vacuum means for creating a vacuum type suction in the second stage of said first flow path, initial storage means for sequentially collecting and discharging measurable quantities of the harvested crop, second conduit means for withdrawing the harvested crop from said harvested crop collection means, said second conduit means connected to initial storage means, and third conduit means connecting said second vacuum means and said initial storage means, said thrashing machine further including primary storage means for receiving the harvested crop discharged from said initial storage means, means for moving the harvested crop discharged from said initial storage means to said primary storage means and second discharge means for discharging the harvested crop from said primary storage means.

2. A thrashing machine as in claim 1 wherein said crop collection means comprises a vertically movable conduit having one end connected to said thrashing assembly and its other end positioned adjacent the ground.

3. A thrashing machine as in claim 2 wherein said other end is flared so as to be substantially as wide as the front of said thrashing machine, said other end also having crop cutting means for cutting the crop attached thereto.

4. A thrashing machine as in claim 3 wherein said crop cutting means comprises a sickle bar and means for developing a rearwardly directed air flow for directing the crop into said flared portion.

5. A thrashing machine as in claim 1 wherein the drive means for the interior thrashing member includes a hollow drive shaft which is connected to and rotatably supports said interior thrashing member and wherein said means for moving at least one of said thrashing members operates within said hollow drive shaft to raise and lower said interior thrashing member.

6. A thrashing machine as in claim 1 wherein said interior thrashing member is provided around its lower edge with a flange portion for directing the flow of material emitted from between the two thrashing members toward said harvested crop collection means.

7. A thrashing machine as in claim 1 wherein the two conically-shaped thrashing members are rotated in the same direction.

8. A thrashing machine as in claim 7 wherein said interior thrashing member is rotated more slowly than the exterior thrashing member so that a rubbing action is created on the material passing therebetween to separate the crop being harvested from the chaff.

9. A thrashing machine as in claim 1 wherein said initial storage means includes first and second chambers and switching means for alternately connecting one of said first or second chambers to said second conduit means and said vacuum means so that the harvested crop withdrawn from said harvested crop collection means is alternately deposited in one or the other of said first and second chambers.

* * * * *